May 24, 1949.   P. I. CHANDEYSSON   2,470,845
DYNAMOELECTRIC MACHINE
Filed May 3, 1944

INVENTOR;
PIERRE I. CHANDEYSSON
By Bruninga & Sutherland
ATTORNEYS

Patented May 24, 1949

2,470,845

UNITED STATES PATENT OFFICE 2,470,845

DYNAMOELECTRIC MACHINE

Pierre I. Chandeysson, St. Louis, Mo.

Application May 3, 1944, Serial No. 533,839

7 Claims. (Cl. 171—324)

This invention relates to dynamo electric machines, and more particularly to a brush holder and bus bar support assembly therefor. The invention is particularly applicable to those machines generating large currents.

In order to secure sparkless commutation, it is necessary that the brushes be accurately positioned with reference to the commutator. This has heretofore been difficult to secure where the parts must be assembled on the frame; adjustment of the elements of the assembly has, therefore, been resorted to. Such adjustment is, however, undesirable because it permits tampering by inexperienced operators and repairmen. Furthermore, in order to conduct large currents, copper bus bars have been employed resulting in considerable expense.

One of the objects of this invention, therefore, is to provide a brush assembly and supporting structure which is so designed that when assembled and mounted on the frame the brushes will be accurately located and positively maintained in their angular positions.

Another object is to provide an assembly of the character described whereby the bus bars may be made of steel, or other material much cheaper than copper.

Further objects will appear from the detail description in which will be set forth an illustrative embodiment of this invention. It will, however, be understood that this invention is susceptible of various embodiments within the scope of the appended claims without departing from the spirit of this invention.

Figure 1:
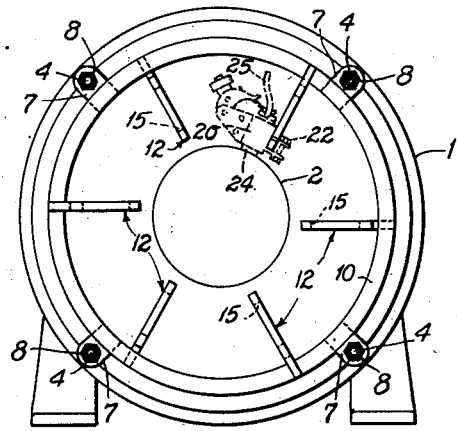
Figure 1 is an end elevation of a dynamo electric machine illustrating one embodiment of this invention.
Figure 4:
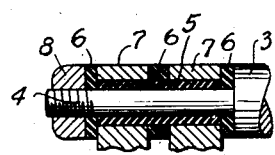
Figure 4 is a section on the line 4—4.

Generally stated, and in accordance with an illustrative embodiment of this invention, a ring structure is provided which has brush holder supports extending radially inwardly therefrom; and these supports may also extend axially. The holder support is preferably in the form of a hollow rectangular configuration to provide a bar for the brush holder. Attachment lugs extend radially outwardly from the ring structure. The ring structure may consist of a pair of spaced rings secured in parallel relation. The brush holder supports are so spaced circumferentially with reference to the lugs, that when the ring structure is reversed, the supports of one pair will be intermediate the supports on the other pair. The ring structure provides a bus bar to which the brushes are electrically connected. A plurality of ring structures may be employed and they are insulatedly mounted on the frame and also insulated from each other.

In the drawings the illustration of the frame 1 is general, while the rotor has simply been designated by the circumference 2 of its commutator. Projecting axially from the end of the frame are a series of posts 3, which may be welded to the end of the frame. Each of these posts may be reduced in diameter, as shown at 4 to receive a bushing 5 and washers 6, all of insulating material. Mounted on these bushings and spaced by the washers are lugs or ears 7 which are thus insulated from each other and secured on the posts by nuts 8.

Figure 3:
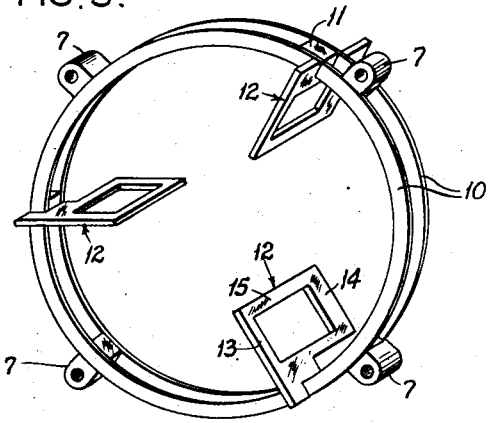
Figure 3 is a perspective of a ring structure embodying this invention.

Referring now to Figure 3, this shows a ring structure from which the lugs 7 project radially outwardly. The ring structure may be made of steel and, as shown, comprises a pair of spaced rings 10 held in spaced relation by spacers 11. Projecting radially inwardly from the ring structure is a series of brush holder supports 12 which, as shown, also project axially. Each brush holder support comprises a hollow rectangular frame including side pieces 13 and 14 and a cross piece 15 forming a bar. The ring structure may be made in any suitable manner, a convenient way being to form the rings 10 by cutting them from sheets, or by bending them from bars or strips, and then welding the parts together, that is, welding the rings together by the spacers 11, welding the ears 7 on the spaced rings and welding the supports 12 on the rings.

Figure 2:
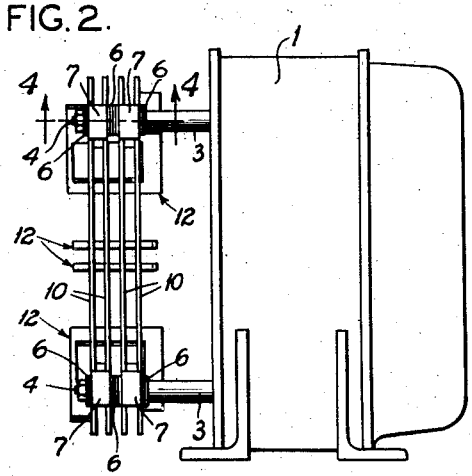
Figure 2 is a side elevation.

For a six pole machine there will be three brush holder supports on a ring structure and the ring structures can be in duplicate and placed, as shown in Figures 1 and 2, with the supports on one ring structure located intermediate of and projecting oppositely axially with respect to the supports on the other ring structure. These ring structures can then be mounted on the posts 4, as previously described, with the ring structures entirely insulated from each other.

Figure 5:
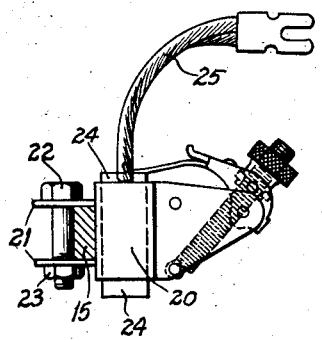
Figure 5 is a detail showing the mounting of the brush holder on the support.

Each of the supports is arranged to receive on each bar 15 a brush holder 20 of any suitable form, as shown in Figure 5, the holder being provided with spaced ears 21 embracing the bar 15 and secured by a screw 22 threaded into a nut 23 on one of the ears. The brush 24 has a lead 25 which is electrically connected to the support in any suitable manner. A series of brush holders may be mounted along the bar 15 and connected as described. Leads may be electrically connected to the ring structures in any suitable manner, as by clamps.

It will thus be seen that a very convenient and economical arrangement is provided. The brush holder supports 12 can be fixed accurately radially and axially so as to span definite arcs; this can be accomplished by any suitable jig in which these holders are held, while the parts are welded to the ring structure. The ring structure itself can be made economically and accurately and, when completed, forms a substantial self contained structure. The ring structure, as a whole, can be placed on the right or left side of a machine by employment of a single unitary part, which can be reversed, while the assembly of two such ring structures with the supports of one structure intermediate the supports of the other structure, places the supports circumferentially at equidistant sectors. This is accomplished by the positioning of the supports 12 with reference to the lugs 7 in the manner shown in the drawing, Figure 3, so that by reversibly placing two of the ring structures, as shown in Figure 1, the holders will be equidistant circumferentially. By insulating one ring structure from the other, the brushes of one polarity can be connected directly to a ring structure, so that the ring structures form bus bars. The spacing of the rings of a ring structure and the spacing of the ring structures themselves provide for air spaces facilitating ventilation.

Having thus described the invention, what is claimed is:

1. In a dynamo-electric machine, a ring structure comprising a pair of integrally and electrically connected laterally spaced conducting rings lying in parallel planes, and brush holder supports integrally and electrically connected to both rings and bridging the same.

2. In a dynamo-electric machine, a brush-supporting ring structure adapted for attachment to such a machine, comprising a conducting ring, and a brush holder support in the form of a flat, hollow, rectangular frame, integrally and electrically connected with said ring, extending radially inwardly thereof and lying in a plane at right angles thereto.

3. In a dynamo-electric machine, a ring structure, comprising, an electrically conducting ring, and a brush holder support in the form of a hollow, rectangular frame integrally and electrically connected with said ring and extending radially inwardly and axially thereof, whereby a pair of said ring structures arranged in mutually reversed relation may be spaced to align the brush holder supports thereof with each other.

4. In a dynamo-electric machine, a ring structure comprising a pair of axially spaced integrally and electrically connected conducting rings, and a brush holder support extending inwardly radially therefrom and integrally and electrically connected to both rings.

5. In a dynamo-electric machine, a ring structure, comprising, a pair of integrally and electrically connected rings, attachment lugs integrally connected with and extending radially outwardly from the periphery of said rings, and a series of circumferentially spaced brush holder supports integrally and electrically connected to and extending radially inwardly from said rings.

6. A dynamo-electric machine, comprising, a frame, a series of ring structures mounted on said frame and insulated therefrom and from each other, each of said ring structures comprising a pair of integrally and electrically connected rings lying in parallel planes, and a series of brush holder supports integrally and electrically connected with and extending radially inward from each of said ring structures.

7. In a dynamo-electric machine, an assembly comprising, a pair of ring structures, each having a series of brush holder supports spaced circumferentially and extending radially inward therefrom, each of said ring structures having attaching means positioned circumferentially differently with reference to said brush holder supports, said ring structures being assembled with the brush holders of one structure intermediate to the brush holders of the other structure.

PIERRE I. CHANDEYSSON.

REFERENCES CITED

The following references are of record in the file of this patent:

UNITED STATES PATENTS

| Number | Name | Date |
|---|---|---|
| 575,918 | Wheeler | Jan. 26, 1897 |
| 681,421 | Mallett | Aug. 27, 1901 |
| 713,589 | Balcome | Nov. 18, 1902 |
| 758,631 | Elers | May 3, 1904 |
| 887,639 | Hornung | May 12, 1908 |
| 931,376 | Behrend | Aug. 17, 1909 |
| 1,251,835 | Strutt | Jan. 1, 1918 |
| 1,706,255 | Richard | Mar. 19, 1929 |
| 1,778,599 | Hull | Oct. 14, 1930 |
| 1,794,291 | Hobart | Feb. 24, 1931 |
| 1,823,313 | Bollinger | Sept. 15, 1931 |
| 1,934,521 | Bollinger | Nov. 7, 1933 |

FOREIGN PATENTS

| Number | Country | Date |
|---|---|---|
| 259,382 | Great Britain | Oct. 14, 1926 |